Figure 1:
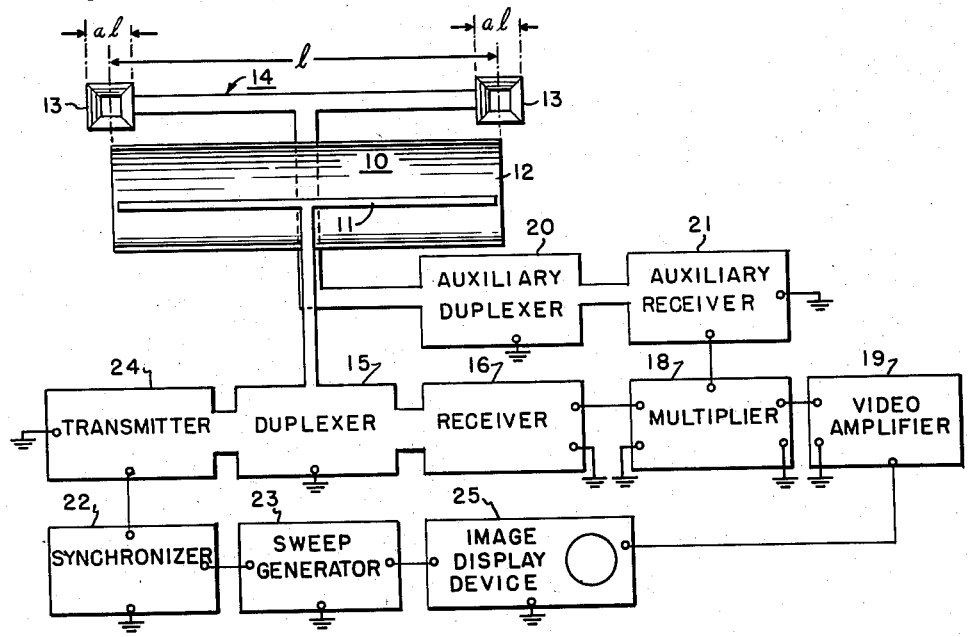

June 27, 1961     R. LA ROSA     2,990,544

RADAR ANTENNA SYSTEM PROVIDING IMPROVED RESOLUTION

Filed April 30, 1957     2 Sheets-Sheet 1

United States Patent Office 2,990,544
Patented June 27, 1961

2,990,544
RADAR ANTENNA SYSTEM PROVIDING IMPROVED RESOLUTION
Richard La Rosa, South Hempstead, N.Y., assignor to Hazeltine Research, Inc., Chicago, Ill., a corporation of Illinois
Filed Apr. 30, 1957, Ser. No. 656,039
10 Claims. (Cl. 343—100)

General

This invention relates to a radar antenna system for improving resolution without increasing the size of the antenna structure. Radar resolution applies to the ability of a radar apparatus to distinguish between two closely situated targets.

The principal determining factor in radar resolution is the beam width of the radiation or field strength pattern established by the particular antenna system employed. It is well known that two targets situated within a beam width of the radar antenna system will appear to an observer as a single target. This particular limitation has hampered the full utilization of radar apparatus in the medium and long range applications. For example, at a distance of 50 miles, an antenna with a 2° beam width cannot distinguish between two targets situated 2 miles apart.

Heretofore, the solution for the problem of increasing resolution most commonly adopted by the art was to increase the size of the antenna structure. In airborne applications, in particular, the aforementioned solution is in many cases impractical often necessitating the abandonment of a particular system under consideration, or at a minimum requiring a structure which materially reduces the flight capabilities of the aircraft.

The radiation, or more rigorously the field strength, patterns usually associated with radar apparatus are characterized by a single major radiation lobe whose ability to resolve between distant targets is a function of the size of the antenna. On the other hand, antenna configurations exhibiting narrow beam widths in proportion to their size as compared with the more widely used radar antenna types are equally unsatisfactory because their field-strength patterns are composed of a plurality of narrow lobes. These narrow antenna lobes, while capable of ample resolution, are also capable of receiving information from many directions, and their usefulness for radar purposes is destroyed.

It is an object of this invention to provide a new and improved antenna system which avoids one or more of the limitations and disadvantages of prior antenna systems.

It is a further object of this invention to provide an antenna system with improved resolution relative to its physical size.

In accordance with the invention, a radar system providing improved resolution comprises a directional antenna for radiating electrical signals and intercepting reflections thereof, this antenna having a directivity characteristic having a single major lobe along a single radius. The radar antenna system further includes a second antenna for also intercepting reflections of the radiated electrical signals, this antenna having a directivity characteristic having a plurality of lobes along a plurality of radii including said single radius with the beam width along any one of the radii being less than that of the directional antenna. Additionally, the radar antenna system includes circuit means for combining the reflected signals intercepted by both antennas to, in effect, simulate a radiation pattern from an antenna having a single major lobe directivity characteristic along a single radius but of reduced beam width whereby the system resolution is improved.

For a better understanding of the present invention, together with other and further objects thereof, reference is had to the following description taken in connection with the accompanying drawings, and its scope will be pointed out in the appended claims.

Figure 2:
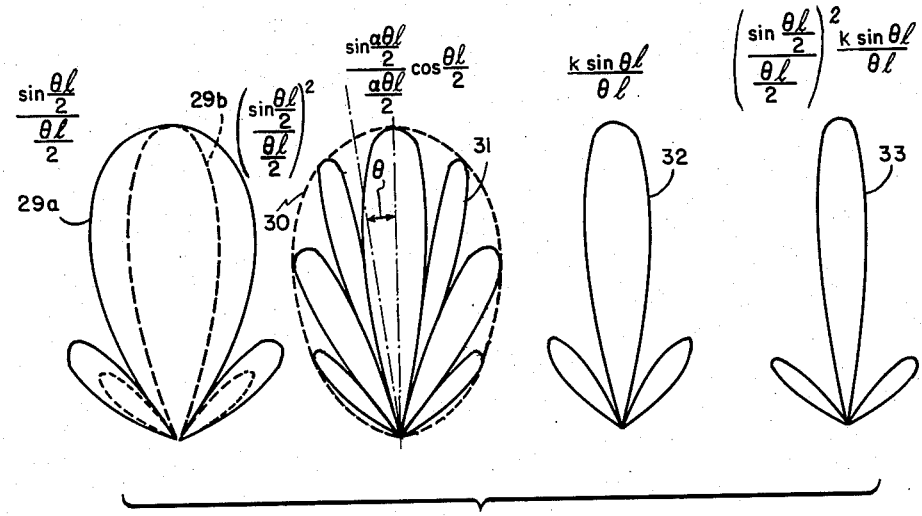
Figure 3:
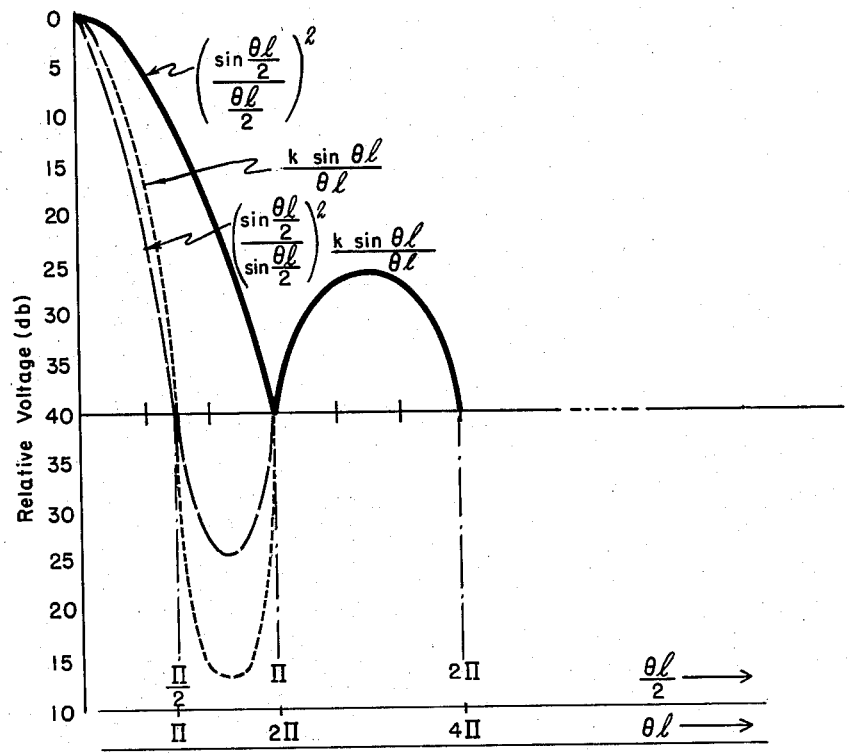
Figure 4:
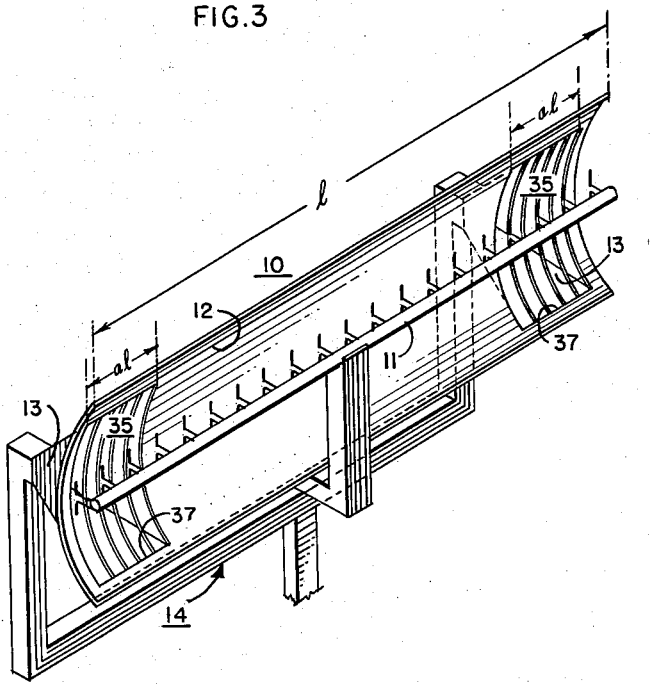

Referring to the drawings:
FIG. 1 illustrates a radar system embodying the present invention in a particular form;
FIGS. 2 and 3 contain curves useful in explaining the operation of the FIG. 1 embodiment, and
FIG. 4 represents a second embodiment of the antenna segment of the radar antenna system.

Description of the FIG. 1 embodiment

Referring to FIG. 1 of the drawings, there is illustrated a radar apparatus embodying a radar antenna system in accordance with the present invention in a particular form. The radar antenna system comprises a directional antenna for radiating electrical signals and intercepting reflections thereof, this antenna having a directivity characteristic having a single major lobe along a single radius. The directional antenna represented as 10 in FIG. 1 includes a radiating and receiving element 11 and a reflecting surface 12. The shape of reflecting surface 12 and radiating element 11 may be constructed in any one of several conventional shapes, the parabolic cylinder and line source, respectively, being represented in FIG. 1.

The radar antenna system also includes a second antenna for also intercepting reflections of the radiated electrical signals, this antenna having a directivity characteristic having a plurality of lobes along a plurality of radii, the beam width along any one of the radii being less than that of the directional antenna 10. The second antenna, hereinafter referred to as auxiliary antenna 14, comprises two receiving elements 13 and 13 mounted on reflecting surface 12 and separated by a distance substantially equal to the longitudinal length of reflecting surface 12. The auxiliary antenna 14 is focused along the axis of radiation of directional antenna 10. As represented in FIG. 1, receiving elements 13, 13 comprise two horns whose width, parallel to the length of directional antenna 10, is substantially smaller than the length of reflecting surface 12. Other well-known configurations suggested for receiving elements 13, 13, but not limited thereto, are the slot array and cross-polarized dipole array forms.

Finally, the radar antenna system includes a circuit for combining the reflected signals intercepted by both antennas to, in effect, simulate a signal from an antenna having a single major lobe directivity characteristics along a single radius but of reduced beam width, whereby the system resolution is improved. This circuit means may include a main receiver system, comprising receiver 16 coupled through duplexer 15 to directional antenna 10. The circuit means further includes an auxiliary receiver system comprising auxiliary receiver 21 coupled through an auxiliary duplexer 20 to receiving elements 13, 13. Additionally, the circuit means includes a multiplier 18. Multiplier 18 includes two input terminals, one connected to the output of receiver 16 and the other connected to the output of the auxiliary receiver 21. Multiplier 18 is a device for multiplying the signals applied from receiver 16 and auxiliary receiver 21 to develop at its output terminal a single signal equal to the product of the two input signals. A suggested construction of multiplier 18 is described on page 152, paragraph 8-4 of the text entitled "Electron Tube Circuits" by Samuel Seely, McGraw Hill Publishing Company.

The remaining blocks perform the functions indicated and comprise the conventional portion of the radar apparatus represented in FIG. 1.

Operation of the FIG. 1 embodiment

The operation of the FIG. 1 embodiment will be explained with reference to the curves in FIGS. 2 and 3. The FIG. 1 embodiment is considered to be operating in accordance with the present invention. The operation is periodic, and the ensuing discussion commences with the start of a typical cycle. In a typical operation, the synchronizer 22 applies a signal simultaneously to the input of sweep generator 23 for initiating the image display sweeps and to the input of transmitter 24 for energizing directional antenna 10. An output pulse from transmitter 24 is coupled through duplexer 15 to directional antenna 10 causing directional antenna 10 to radiate a pulse of electromagnetic energy. In order to simplify the discussion of the present invention it will be assumed that all signals applied to reflecting surface 12 are uniformly distributed over the surface. It is recognized that this condition is not rigorously followed in practice but that there is sufficient similarity between theory and practice to make the relationships described herein valid in practice. On the basis of this assumption the radiated field strength pattern of directional antenna 10 may be described by the mathematical function:

$$\frac{\sin\frac{\theta l}{2}}{\frac{\theta l}{2}} \quad (1)$$

where $\theta$=the radial angle in radians of a radius with respect to the axis along which directional antenna 10 is directed.
$l$=the length in radians of reflecting surface 12.

Curve 29a in FIG. 2 represents the field strength pattern constructed from the Equation 1 relationship. It is readily recognized as the "one-way" field strength pattern of conventional radar antennas. It may be shown that the maximum amplitude of the first side lobe is down 13 db from the maximum amplitude of the major lobe. The energy radiated by directional antenna 10 is intercepted by a target in space, and a reflected signal therefrom is returned toward directional antenna 10. A portion of the reflected signal is intercepted by reflecting surface 12 and coupled through radiating and receiving element 11 to duplexer 15. Making use of the principle of reciprocity, it can be shown that the field strength pattern for received signals is identical to that for radiated signals, and is also governed by the relationship represented in Equation 1. Consequently, the field strength pattern with respect to the transmitted and received signals of directional antenna 10 is $$\left(\frac{\sin\frac{\theta l}{2}}{\frac{\theta l}{2}}\right)^2 \quad (2)$$

The curve 29b in FIG. 2 figuratively represents the Equation 2 relationship. Curve 29b is readily recognized as the "round-trip" field strength pattern of conventional radar antennas. In accordance with Equation 2, the maximum amplitude of the first side lobe may be shown to be 26 db below the maximum amplitude of the major lobe. This figure has been used as an acceptable yardstick.

The received signal after passing through duplexer 15 is applied to receiver 16. Receiver 16 amplifies and detects the signal, and the resulting video pulse is applied to an input terminal of multiplier 18.

Simultaneously with the receipt of the reflected signal by directional antenna 10, a portion of the reflected signal is also intercepted by receiving elements 13, 13. For purposes of this discussion the signal applied to receiving elements 13, 13 is considered to be distributed uniformly over the openings of receiving elements 13, 13. This, again, constitutes an approximation which may be very nearly achieved in practice. Since uniform illumination has been assumed for receiving elements 13, 13, the field strength pattern associated with each acting independently of the other will be similar to the field strength pattern for directional antenna 10, and equal to $$\frac{\sin\frac{\theta al}{2}}{\frac{\theta al}{2}} \quad (3)$$

where $al$=the length of each receiving element 13 in terms of the length of reflecting surface 12. $a$ is therefore a constant of proportionality.
$\theta$=the same variable as defined in Equation 1.

However, receiving elements 13, 13 which comprise the auxiliary antenna 14 constitute an antenna array and as such the individual field strength patterns are modified by an array factor in determining the field strength pattern of the auxiliary antenna 14. The array factor is derived from the familiar relationship shown on page 382 of "Reference Data for Radio Engineers," third edition, published by the Federal Telephone and Radio Corporation, and for the instant invention is found to be:

$$\frac{\sin\frac{\theta al}{2}}{\frac{\theta al}{2}}\left(\cos\frac{\theta l}{2}\right) \quad (4)$$

The sine function in Equation 4 introduces a modulation component for the cosine function in Equation 4. Curve 31 in FIG. 2 represents the field strength pattern constructed in accordance with Equation 4. The plurality of lobes included in curve 31 is caused by the modulation effect of the sine function. The dotted outline 30 represents the major lobe of the field strength pattern represented by the sine function in Equations 3 and 4. Curve 30, when compared to curve 31 is seen to be a comparatively slow-changing function. For this reason, it is possible to assume that the sine function in Equation 4 is constant when compared with that of the cosine function. The accuracy of this approximation is determined by the proportionality constant $a$, becoming more accurate as $a$ decreases. In the interest of clarity the sine function in Equation 4 will be replaced by the constant $k$ and Equation 4 becomes:

$$k\cos\frac{\theta l}{2} \quad (5)$$

Equation 5 therefore represents the field strength pattern of the auxiliary antenna acting as a receiving antenna.

The signal intercepted by the auxiliary antenna 14 is coupled through auxiliary duplexer 20 to auxiliary receiver 21, in the auxiliary receiving system. Auxiliary receiver 21, amplifies and detects the signal and the resulting video pulse is applied to a second input terminal of multiplier 18.

Recalling that the transmitted signal was radiated by the directive antenna 10 and received by the auxiliary antenna, the round-trip field strength pattern for the auxiliary system is therefore determined by the product of Equation 1 and Equation 5 denoting the field strength distribution of the transmitted and received signals, respectively. Simplified, the product is equal to $$k\frac{\sin\theta l}{\theta l} \quad (6)$$

When compared with Equation 1, it is seen that Equation 6 represents a one-way field strength pattern obtained from a directional antenna twice the size of directional antenna 10. Curve 32 in FIG. 2 represents the Equation 6 relationship. Although field strength distribution indicated by Equation 6 is substantially narrower than field strength pattern for directive antenna 10, the antenna system described thus far is not suitable for radar use because the side lobes developed are merely 13 db down from the maximum sensitivity. The presence of these rather excessive side lobes overshadows the improved resolution, achieved with a narrow beam width, since under certain conditions signals may be received from these directions.

By displaying the product of the two received signals, that is, the product of Equation 6 and Equation 2, it is possible to reduce the side lobes to a value suitable for radar use. It will be shown that magnitude of the side lobes is made substantially equal to that of directional antenna 10 or 26 db below maximum sensitivity. This is effected without altering substantially the narrow beam width, high resolution characteristics of the auxiliary antenna system. The product of Equation 6 and Equation 2 is $$\left(\frac{\sin\frac{\theta l}{2}}{\frac{\theta l}{2}}\right)^2 (k)\frac{\sin \theta l}{\theta l} \qquad (7)$$

The relationship established in Equation 7 is represented by curve 33 in FIG. 2. While the curves in FIG. 2 are not intended to be drawn to scale, the relative beam widths and the relative amplitudes of the side lobes are representative of the results expected with the present invention. The combined output from multiplier 18 is a video signal equal to the product of the received signals from directive antenna 10 and auxiliary antenna 14. The combined signal strength is determined by the overall field strength pattern developed in accordance with the function specified by Equation 7. The present invention therefore combines the singly-directive but rather poor resolution characteristic of the directive antenna 10, with the multiple-directive but high resolution characteristic of the auxiliary antenna 14 to produce a singly-directive and highly selective antenna system.

The output signal from multiplier 18, representing the product of the two received signals, is applied to video amplifier 19 where it is amplified. The amplified signal is coupled to image display device 25 for viewing. The operation just described is repeated periodically as is conventional in radar practice.

The curves in FIG. 3 are quantitative representations of the curves identified therein. It is to be noted that the field strength pattern of the combined system contains first side lobes whose magnitude is no more than the magnitude of the side lobes from the directive antenna 10 alone. The resolving power of the combined system proposed by the present invention is more than twice that of the directive antenna 10. This was achieved without increasing the physical size of the antenna mechanical assembly.

*Description and operation of FIG. 4 embodiment*

In FIG. 4 there is represented an alternate means for constructing the directive antenna 10 in combination with auxiliary antenna 14. A unified construction is represented in which auxiliary antenna 14 is mounted behind reflecting surface 12 and receives signals through an opening provided in reflecting surface 12. The elements performing the same functions described in the FIG. 1 embodiment are labeled similarly. The antenna structure consists of a directive antenna 10, including a radiating and receiving element 11 and reflecting surface 12. In construction and size the antenna is substantially identical to that described for FIG. 1 except that two sets of vertical slots 37, 37 to form a pair of gratings 35, 35 have been inserted through reflecting surface 12 adjacent to the short edges of reflecting surface 12. Auxiliary antenna 14 is mounted on reflecting surface 12 directly behind vertical slots 37, 37. The gratings 35, 35 are physically as large as the openings in receiving elements 13, 13 of auxiliary antenna 14. In all other respects, the system is the same as that of the FIG. 1 embodiment.

The operation of the FIG. 4 embodiment is founded on the utilization of the polarization characteristics of microwaves. If it is assumed that directive antenna 10 is vertically polarized, the existence of gratings 35, 35 on reflecting surface 12 will not affect the reflecting property of reflecting surface 12. It is well known in the art that a grating comprising a plurality of vertical slots will act as a reflecting surface for vertically polarized energy as though it were a continuous surface. On the other hand, while barring the passage of vertically polarized energy, gratings 35, 35 will readily translate horizontally polarized energy. Consequently, a signal transmitted by directive antenna 10 will not pass through the gratings 35, 35 to receiving elements 13, 13. The radiated signal is subsequently intercepted by a distant target and a reflected signal is returned to the antenna assembly. It is also well known in the art that a radar target reflects energy with all polarizations and, therefore, an equal amount of vertically and horizontally polarized energy is included in the signal that is returned. The vertically polarized energy is intercepted by reflecting surface 12, including gratings 35, 35 and coupled to the main receiver system where the signal will be amplified, detected, and applied to the first input terminal of multiplier 18. Directive antenna 10, however, is insensitive to the horizontally polarized energy intercepted by reflecting surface 12, and this energy is not received by the main receiver system.

While gratings 35, 35 acted to bar the passage of vertically polarized energy, they act as an efficient translator for horizontally polarized energy. Accordingly, this portion of the reflected signal is transmitted through gratings 35, 35 to receiving elements 13, 13. The horizontally polarized signal is coupled to the auxiliary receiving system where it is amplified, detected, and coupled to the second input terminal of multiplier 18. The sequence of events following the receipt of video signals by multiplier 18 is identical to that described with respect to the FIG. 1 embodiment and need not be described once more.

Clearly, where the respective polarizations of the directive antenna 10 and auxiliary antenna are reversed, the slots 37 in gratings 35, 35 may be constructed horizontally on reflecting surface 12. In this way gratings 35, 35 will act as a reflector for horizontally polarized energy and permit the passage of vertically polarized energy to receiving elements 13, 13.

The previous discussion has been limited to means for reducing the beam width of a directive antenna and thereby increasing its resolution. No consideration has been given, thus far, to the over-all gain of the proposed system with respect to a system utilizing a conventional directive antenna alone. It can be shown that the power ratio, or gain as it is commonly referred to, of the auxiliary antenna to that of directive antenna 10 is equal to $2a$. Since $a$ was assumed to be a constant of proportionality smaller than unity, the gain of the proposed system is less than that of the directive antenna 10, since the product of the two signals is displayed. In practice, therefore, at extreme ranges, determined by transmitter power, it is preferable to operate the radar apparatus without the increased resolution afforded by utilization of the auxiliary antenna. At moderate ranges, however, it is advisable to take advantage of the increased resolution available through the utilization of auxiliary antenna. In practice this may be accomplished automatically by the use of gain-time control. In the early part of the range sweep, video information from both receiving systems will be processed, while on the latter portion of the sweep only the main receiver video will be processed. The parameters chosen for both antennas will determine the point at which the operation is switched from high resolution to normal resolution.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A radar antenna system providing improved resolution and comprising: a directional antenna for radiating electrical signals and intercepting reflections thereof, this antenna having a directivity characteristic having a single principal lobe along a single radius; a second antenna for also intercepting reflections of the radiated electrical signals, this antenna having a directivity characteristic having a plurality of lobes along a plurality of radii including said single radius, the beam width along any one of the radii being less than that of the directional antenna; and circuit means for combining the reflected signals intercepted by both antennas to, in effect, simulate a radiation pattern from an antenna having a single major lobe directivity characteristic along said single radius but of reduced beam width, whereby the system resolution is improved.

2. A radar antenna system providing improved resolution and comprising: a directional antenna horn and reflector, said reflector uniformly illuminated by said horn, for radiating electrical signals and intercepting reflections thereof, this antenna having a directivity characteristic having a single major lobe along a single radius; a second antenna comprising two receiving elements for also intercepting reflections of the radiated electrical signals and uniformly illuminated thereby, this antenna having a directivity characteristic having a plurality of lobes along a plurality of radii including said single radius, the beam width along any one of the radii being less than that of the directional antenna; and circuit means for combining the reflected signals intercepted by both antennas to, in effect, simulate a radiation pattern from an antenna having a single major lobe directivity characteristic along a single radius but of reduced beam width, whereby the system resolution is improved.

3. A radar antenna system providing improved resolution and comprising: a directional antenna for radiating electrical signals and intercepting reflections thereof, this antenna having a field strength characteristic substantially determined by the function $$\frac{\sin \frac{\theta l}{2}}{\frac{\theta l}{2}}$$

having a single major lobe along a single radius; a second antenna for also intercepting reflections of the radiated electrical signals, this antenna having a field strength characteristic substantially determined by the function $$\frac{\sin \frac{\theta al}{2}}{\frac{\theta al}{2}} \cos \theta l$$

having a plurality of lobes along a plurality of radii including said single radius, the beam width along any one of the radii being less than that of the directional antenna; and circuit means for combining the reflected signals intercepted by both antennas to, in effect, simulate a radiation pattern from an antenna having a single major lobe field strength characteristic substantially determined by the function $$\left(\frac{\sin \frac{\theta l}{2}}{\frac{\theta l}{2}}\right)^2 \frac{\sin \frac{\theta al}{2}}{\frac{\theta al}{2}} \cos \theta l$$

whereby the system resolution is improved.

4. A radar antenna system providing improved resolution and comprising: a directional antenna for radiating electrical signals and intercepting reflections thereof, this antenna having a directivity characteristic having a single major lobe along a single radius; a second antenna comprising two receiving elements substantially smaller than the directional antenna for also intercepting reflections of the radiated electrical signals, this antenna having a directivity characteristic having a plurality of lobes along a plurality of radii including said single radius, the beam width along any one of the radii being less than that of the directional antenna; and circuit means for combining the reflected signals intercepted by both antennas to, in effect, simulate a radiation pattern from an antenna having a single major lobe directivity characteristic along said single radius but of reduced beam width, whereby the system resolution is improved.

5. A radar antenna system providing improved resolution and comprising: a directional antenna for radiating electrical signals and intercepting reflections thereof, this antenna having a directivity characteristic having a single major lobe along a single radius; a second antenna comprising two receiving elements substantially smaller than and disposed near the ends of the longitudinal axis of the directional antenna for also intercepting reflections of the radiated electrical signals, this antenna having a directivity characteristic having a plurality of lobes along a plurality of radii including said single radius, the beam width along any one of the radii being less than that of the directional antenna; and circuit means for combining the reflected signals intercepted by both antennas to, in effect, simulate a radiation pattern from an antenna having a single major lobe directivity characteristic along said single radius but of reduced beam width, whereby the system resolution is improved.

6. A radar antenna system providing improved resolution and comprising: a directional antenna for radiating electrical signals and intercepting reflections thereof, this antenna having a directivity characteristic having a single major lobe along a single radius; a second antenna for also intercepting reflections of the radiated electrical signals, this antenna having a directivity characteristic having a plurality of lobes along a plurality of radii including said single radius, the beam width along any one of the radii being less than that of the directional antenna; and circuit means for receiving and multiplying the reflected signals intercepted by both antennas to, in effect, simulate a radiation pattern from an antenna having a single major lobe directivity characteristic along said single radius but of reduced beam width, whereby the system resolution is improved.

7. A radar antenna system providing improved resolution and comprising: a directional antenna for radiating electrical signals and intercepting reflections thereof, this antenna having a directivity characteristic having a single major lobe along a single radius; a second antenna for also intercepting reflections of the radiated electrical signals, this antenna having a directivity characteristic having a plurality of lobes along a plurality of radii including said single radius, the beam width along any one of the radii being less than that of the directional antenna; a main receiver system coupled to the directional antenna; an auxiliary receiving system coupled to the second antenna; and circuit means jointly responsive to both receivers for combining the reflected signals intercepted by both antennas to, in effect, simulate a radiation pattern from an antenna having a single major lobe and directiv- 8. A radar antenna system providing improved resolution and comprising: a directional antenna for radiating electrical signals and intercepting reflections thereof, this antenna having a directivity characteristic having a single major lobe along a single radius; a second antenna for also intercepting reflections of the radiated electrical signals, this antenna having a directivity characteristic having a plurality of lobes along a plurality of radii including said single radius, the beam width along any one of the radii being less than that of the directional antenna; a main receiver system coupled to the directional antenna for producing a first video signal; an auxiliary receiving system coupled to the second antenna for producing a second video signal; and a multiplier jointly responsive to both video signals for combining the reflected signals intercepted by both antennas to, in effect, simulate a radiation pattern from an antenna having a single major lobe and directivity characteristic along said single radius but of reduced beam width, whereby the system resolution is improved.

9. A radar antenna system providing improved resolution and comprising: a directional antenna for radiating electrical signals and intercepting reflections thereof, this antenna having a directivity characteristic having a single major lobe along a single radius; a second antenna for also intercepting reflections of the radiated electrical signals, this antenna having a directivity characteristic having a plurality of lobes along a plurality of radii including said single radius, the beam width along any one of the radii being less than that of the directional antenna; a main receiver system coupled to the directional antenna; an auxiliary receiving system coupled to the second antenna; and a multiplier jointly responsive to both receivers for multiplying the reflected signals intercepted by both antennas to, in effect, simulate a radiation pattern from an antenna having a single major lobe and directivity characteristic along said single radius but of reduced beam width, whereby the system resolution is improved.

10. A radar antenna system providing improved resolution and comprising: a directional antenna for radiating electrical signals and intercepting reflections thereof, this antenna having a field strength characteristic substantially determined by the function $$\frac{\sin \frac{\theta l}{2}}{\frac{\theta l}{2}}$$

having a single major lobe along a single radius; a second antenna comprising two receiving elements, substantially smaller than and disposed at the ends of the longitudindal axis of said directional antenna for also intercepting reflections of the radiated electrical signals, this antenna having a field strength characteristic substantially determined by the function $$\frac{\sin \frac{\theta al}{2}}{\frac{\theta al}{2}} \cos \theta l$$

having a plurality of lobes along a plurality of radii including said single radius, the beam width along any one of the radii being less than that of the directional antenna; a main receiver system coupled to the directional antenna for producing a first video signal; an auxiliary receiving system coupled to the second antenna for producing a second video signal; and a multiplier jointly responsive to both video signals for combining the reflected signals intercepted by both antennas to, in effect, simulate a radiation pattern from an antenna having a single major lobe and field strength characteristic substantially determined by the function $$\left(\frac{\sin \frac{\theta l}{2}}{\frac{\theta l}{2}}\right)^2 \frac{\sin \frac{\theta al}{2}}{\frac{\theta al}{2}} \cos \theta l$$

whereby the system resolution is improved.

References Cited in the file of this patent
UNITED STATES PATENTS

| | | |
|---|---|---|
| 2,458,885 | Warren | Jan. 11, 1949 |
| 2,471,284 | Rea | May 24, 1949 |